United States Patent [19]
Takemae et al.

[11] 4,390,259
[45] Jun. 28, 1983

[54] FLASH OUTPUT CONTROL APPARATUS FOR CAMERA

[75] Inventors: Mikio Takemae, Yokohama; Yuji Ohkubo, Ohmiya, both of Japan

[73] Assignee: Nippon Kogaku K.K., Tokyo, Japan

[21] Appl. No.: 300,584

[22] Filed: Sep. 9, 1981

[30] Foreign Application Priority Data

Sep. 18, 1980 [JP] Japan .................. 55/128606

[51] Int. Cl.³ .......................................... G03B 15/05
[52] U.S. Cl. .................................................. 354/34
[58] Field of Search .................. 354/32, 33, 145, 147, 354/34

[56] References Cited
U.S. PATENT DOCUMENTS 4,089,013  5/1978  Hasegauoa et al. ............. 354/34 X Primary Examiner—Michael L. Gellner
Attorney, Agent, or Firm—Fitzpatrick, Cella, Harper & Scinto

[57] ABSTRACT

A flash output control apparatus for a camera comprises a switch including a contact segment movable between a first electrical contact and a second electrical contact, and control means. Interlocking with the full opening of exposure aperture by the shutter device, the contact segment moves apart from the first contact and then comes into contact with the second contact. When the contact segment leaves the first contact toward the second one, the flash output control circuit is brought into operation. Thereafter, when the contact segment comes into contact with the second contact, the flash tube starts flashing.

5 Claims, 5 Drawing Figures

U.S. Patent     Jun. 28, 1983     4,390,259
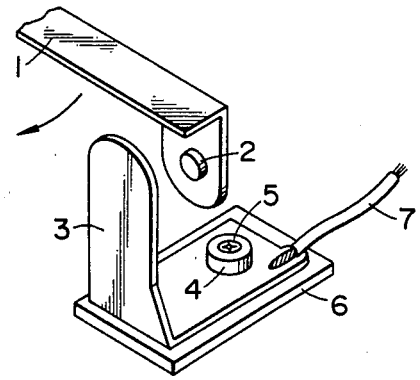
FIG. IA
PRIOR ART
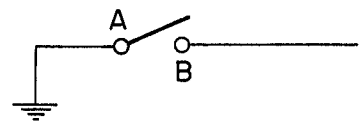
FIG. IB
PRIOR ART
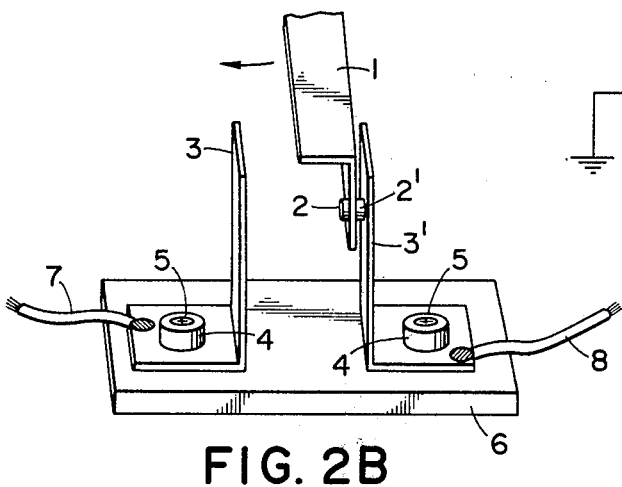
FIG. 2B
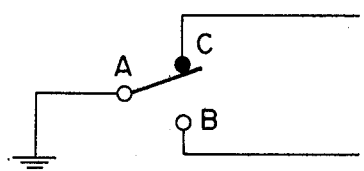
FIG. 2B
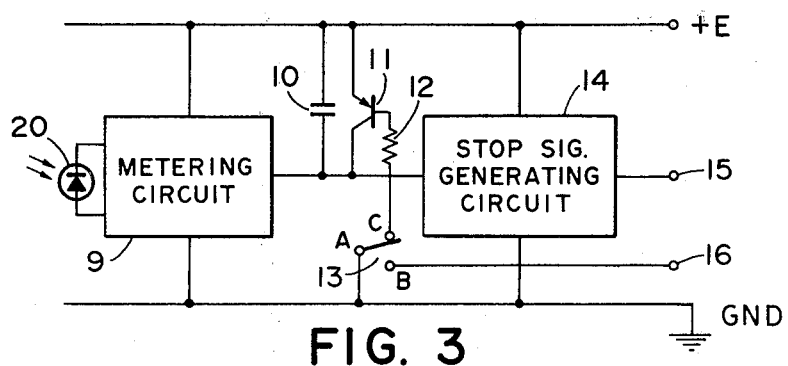
FIG. 3

FLASH OUTPUT CONTROL APPARATUS FOR CAMERA

BACKGROUND OF THE INVENTION

1. Field of the Invention

The present invention relates to a flash output control apparatus of a flash device useful when flash light photography is carried out with a camera. More particularly, the present invention relates to such flash output control apparatus for a TTL automatic flash output control type of camera provided with a focal plane shutter.

2. Description of the Prior Art

It is known in the art to carry out flash light photography employing a TTL automatic flash output control system. A camera hitherto proposed for this purpose includes a photo receptor provided within the camera to receive the reflected light from the object being illuminated by the flash light. The photo receptor is so disposed as to receive the light transmitted through a taking lens in the camera. Also, a flash output control circuit is provided to determine the object illumination time depending upon the output from the photo receptor and to terminate the flashing of the flash device at the end of the determined illumination time. The flash output control circuit includes a timer circuit for counting the time necessary for controlling the flash output. The timer circuit is made to start counting the time in relation to the running of the opening blade of the focal plane shutter. In this type of camera, according to the prior art, to start the operation of the timer circuit, there has been used a signal derived from a trigger switch which is actuated in synchronism with the start of running of the opening shutter blade.

However, the use of a trigger switch signal as the start signal for the timer circuit has a problem as will be described hereinafter.

While the timer circuit is made to start operating by the signal of the trigger switch, the timing for starting flashing of the flash device, on the other hand, is given by a synchronous switch. As known to those skilled in the art, this synchronous switch is required to operate in synchronism with the completion of running of the opening shutter blade. Since, as previously noted, the trigger switch from which the start signal for the timer circuit is obtained is actuated in synchronism with the start of running of the opening blade, there is produced a time lag from the start of operation of the timer circuit from the start of flashing so long as the trigger switch is actuated in a timer circuit as conventionally used. This time lag generally amounts to about 10 milliseconds.

During the period of this time lag, the control circuit is active and therefore the quantity of object light during this 10 ms. is integrated into a value of light quantity. 10 ms. later, the flash tube begins flashing and the object light derived from this flash light is integrated by the output control circuit in the same manner as above. Consequently, the integrated value of light quantity during the time lag of 10 ms. is added to the integrated value derived from the real flash light. The result is that the flashing of the flash tube is prematurely terminated by the output control apparatus before the flash output reaches the proper exposure value to the object. Thus, the photograph is taken with underexposure resulting in a poor quality of picture.

SUMMARY OF THE INVENTION

Accordingly, it is the general object of the invention to solve the problem involved in the prior art mentioned above.

It is a more specific object of the invention to provide a flash output control apparatus for a camera which is simple in structure and enables minimization of errors in controlling the flash output.

It is another object of the invention to provide such flash output control apparatus in which the time lag from the start of flash output control to the start of flashing is very short as compared with that in the apparatus according to the prior art.

Other and further objects, features and advantages of the invention will appear more fully from the following description taken in connection with the accompanying drawings.

BRIEF DESCRIPTION OF THE DRAWINGS

FIG. 1A shows the structure of a conventional synchronous switch;

FIG. 1B is the circuit diagram thereof;

FIG. 2A shows the structure of a switch embodied in the apparatus according to the invention;

FIG. 2B is the circuit diagram thereof; and

FIG. 3 is a circuit diagram of the flash output control apparatus for a camera in accordance with the invention.

DETAILED DESCRIPTION OF THE INVENTION

In order to solve the above problem involved in the prior art, it is necessary to minimize the time lag of the flashing start from the start of flash output control. Man may think that it can be attained simply by using the flash start signal generated by the synchronous switch also as the start signal for flash output control. However, this is not permissible for the following reason:

FIG. 1A shows the structure of a conventional synchronous switch for starting flash. Designated by 1 is a conductive member which is rotated about a shaft (not shown) in the direction of arrow at the time of completion of the running of the shutter opening blade. Through the shaft, not shown, the conductive member 1 is grounded to the camera body. Also, the conductive member 1 has an electrode 2 fixed thereto. 3 is a conductive member fixed to a shutter casing, not shown, by a screw 5. This conductive member 3 is electrically isolated from the shutter casing by isolation spacers 4 and 5. A lead wire 7 connects the conductive member 3 to a synchro-contact of a flash device.

FIG. 1B shows the electric circuit of the synchronous switch shown in FIG. 1A. Terminal A represents the terminal on the side of electrode 2 on the conductive member 1. Terminal B represents the terminal on the side of lead wire 7 of the conductive member 3.

The synchronous switch operates as follows:

Man mounts a flash device on the camera and releases the camera shutter. Thereby, a movable reflecting mirror is moved up, the opening blade starts running and the trigger switch is actuated. When the running of the opening blade is just completed, the conductive member 1 rotates in the direction of arrow through an interlocking mechanism, not shown, until the electrode 2 on the member 1 comes into contact with the conductive member 3. At that time, the terminal of the synchro-contact is grounded to the camera body through the lead wire 7 and the conductive member 1. Thus, the flash device begins flashing.

For the purpose of explanation, let us consider the case where the output generated by the above actuation of the synchronous switch is introduced into the flash output control circuit with the intention of starting the flash output control simultaneously with the start of flashing. In this case, a high voltage ranging from several tens to several hundreds of volts will be applied to the conductive member 3 before the closing of the synchronous switch. Moreover, at the time of the switch being closed, a large current will flow through the electrode 2 and conductive member 3 for a moment. However, the circuit on the side of camera is so formed as to operate with low voltage and small current. Therefore, application of such signal on the circuit in the camera is undesirable. In addition, since the electrode 2 is made of material for large current, there is produced chattering. As a result, malfunctions of the circuit in the camera may be caused by the signals generated therefrom.

For these reasons, the signal generated by the synchronous switch can not be used as the start signal for flash output control. If used, then there arises a difficult problem as described above. Therefore, such an electrical arrangement is unallowable for the above mentioned type of camera.

FIG. 2A shows the novel switch of flash output control apparatus for camera in accordance with the invention. Like reference numerals of FIG. 1A represent the same or corresponding elements.

In FIG. 2A, the conductive member 1 has two electrodes 2 and 2'. The electrode 2 is that for large current and the other electrode 2' on the back side is that for small current without chattering. The small current electrode 2' is opposed to a conductive member 3' which is connected to the flash output control circuit through a lead wire 8. The conductive member 1 is biased by a spring or the like, not shown, so that the electrode 2' is normally in contact with the conductive member 3'.

FIG. 2B shows the electric circuit of the switch shown in FIG. 2A. Terminal A represents the terminal on the side of the conductive member 1 and electrodes 2, 2'. Terminal B is that on the side of conductive member 3 and lead wire 7 and terminal C is that on the side of conductive member 3' and lead wire 8.

Upon completing the running of the opening blade after releasing the shutter, the conductive member 1 is rotated in the direction of arrow through an interlocking mechanism, not shown. At that time, the electrode 2' moves away from the conductive member 3' with which the electrode 2' was in contact. As a result, a signal for starting the flash output control is delivered to the flash output control circuit through the lead wire 8. After a further rotation of the conductive member 1 in the direction of arrow, the electrode 2 on the member 1 comes into contact with the conductive member 3. At this time point, the terminal of synchro-contact of the flash device is grounded through the lead wire 7 and therefore the flash device begins flashing. Since, as previously noted, the electrode 2 is an electrode for large current, there may occur chattering when the electrode 2 comes into contact with the conductive member 3. Before the electrode 2 comes into contact with the member 3, the other electrode 2' has already been moved away from the corresponding conductive member 3'. However, the electrode 2' may be brought into contact with the member 3' again undesirably by chattering occurred at the contact of electrode 2 with the member 3. To prevent it, a sufficient space is provided between the two members 3 and 3'.

With such an arrangement of the synchronous switch according to the invention, the time lag from the start of flash output control to the start of flashing is limited to only the time which passes from the departure of electrode 2' from the member 3' to the contact of electrode 2 with the member 3. This time lag is very small as compared with the conventional case where the flash output control is started by the trigger switch.

FIG. 3 shows a circuit form of the flash output control apparatus for a camera according to the invention in which the switch shown in FIGS. 2A and B is used. This circuit form is particularly suitable for a TTL automatic flash output control type of camera.

In FIG. 3, a photometering circuit generally designated by 9 includes a photo receptor element 20 for receiving the reflected light from a film plane. In accordance with information of light value given by the photo receptor element 20 and other exposure factors optionally introduced in the control circuit such as information of diaphragm value and ASA information, a determined amount of charge current is applied to a storage condenser for flash output control 10. 14 is a stop signal generating circuit. When the charge voltage on the storage condenser 10 reaches a predetermined reference value, the stop signal generating circuit 14 detects it and then produces at its terminal 15 a signal for stopping the flashing of the flash device. 13 is the switch shown in FIGS. 2A and B. Since the terminal A of the switch 13 is normally in contact with the terminal C, the base of transistor 11 is grounded through a resistance 12. Therefore, the condenser 10 is normally held in discharged state by the transistor 11. The terminal B of the switch 13 is connected to the terminal 16 of synchro-contact of the flash device.

The manner of operation of the above control circuit is as follows:

Before releasing the shutter, the base of transistor 11 is grounded through the resistor 12 and the terminals A and C of switch 13. In this condition, therefore, the transistor 11 is ON and the condenser 10 is in the state discharged through the transistor 11.

When the shutter is released, the opening blade starts running. Upon the completion of running of the opening blade, the terminal A of the switch 13 moves away from the terminal C. At that time, the transistor 11 is turned OFF and current starts flowing into the condenser 10 from the circuit 9 to charge the condenser.

When the terminal A comes into contact with the terminal B, the terminal 16 of synchro-contact of the flash device is grounded through the terminals A and B of the switch 13. Thus, the flash device starts flashing. At this time there may occur chattering between the terminals A and B. However, as the flash device starts flashing at the first contact of the terminal A and B, such chattering has no effect on the flash timing.

After starting flashing in this manner, the condenser 10 continues to be charged with charge corresponding to the integrated quantity of light. When the charge voltage on the condenser 10 reaches a predetermined reference level, the stop signal generating circuit 14 detects it. To this end, the circuit 14 includes a comparator for making a comparison between the voltage on the condenser and the reference voltage. When the coincidence between the voltage on the condenser 10 and the reference voltage is detected, the circuit 14 puts out into the terminal 15 a stop signal by which the flashing of the flash device is terminated. In this manner, the flash device can emit flash light in a proper quantity.

While the invention has been particularly shown and described with reference to a preferred embodiment thereof, it will be obvious to those skilled in the art that various changes and modifications may be made therein without departing from the spirit and scope of the invention.

For example, in the shown embodiment, the storage condenser for flash output control has been short-circuited by a transistor 10 to hold it in discharged state and the operation for controlling the flash output has been started by turn-off of the transistor. However, to start the operation for controlling the flash output there may be used a switching element such as transistor connected in the current supply line to the metering circuit 9. In this modification, the switching element is turned On and Off by the above switch 13 to control the operation of the metering circuit 9. Thus, the same object as above can be attained by this modification. As another modification, a suitable biasing circuit part may be provided for operating the metering circuit 9. In this case, the biasing circuit part is controlled by the above described switch 13 to start the flash output control operation in good timing.

Cameras to which the apparatus of the invention is applicable are never limited to those of TTL automatic flash output control type only. The control apparatus of the invention is applicable also to any common camera of the type in which a flash device is mounted on it through a hot-shoe. In this case, a transistor 11 is provided in the flash device of automatic output control type containing therein a storage capacitor 10. The transistor 11 is so connected as to discharge the capacitor 10. Terminal C is directly connected to the transistor 11 within the flash device.

As readily understood from the foregoing, the flash output control apparatus according to the invention has many advantages over the prior art ones.

According to the invention, the time lag from the start of flash output control to the start of flashing can be reduced to a great extent as compared with that of the prior art. Therefore, a very correct and proper exposure can be attained.

The control apparatus of the present invention has in itself a function to regulate the order of successive operations, that is, to initiate at first the flash output control operation and then initiate flashing of the flash device. Therefore, according to the invention it is no longer necessary to provide a particular circuit for regulating the order of successive operations. Thereby a further simplification of control circuit can be attained.

Further, in the control apparatus of the present invention, the contact between terminals A and C required to start the operation of flash output control by the switch 13 is effected by a small current electrode 2'. This arrangement has an effect to prevent chattering. Even if there occurred chattering, terminals A and B can not be contacted with each other by such chattering and therefore the flash device never starts flashing due to such chattering.

In the control apparatus of the present invention, the small current terminal C on the side of the flash output control circuit is completely separated from the large current terminal B on the side of X contact of the flash device in respect of operational timing. This arrangement prevents the control circuit from being detrimentally affected by chattering between terminals B and A.

According to the invention, single switch 13 is used for two different purposes, namely for generating a flash output control start signal on one hand and for starting flashing of the flash device on the other hand. Therefore, the control apparatus of the invention is simple in structure. It is no longer necessary to provide a particular circuit, for example, for generating a flash output control start signal by the operation of a synchronous switch. This also enables simplification of wirings between the control device and the flash device.

We claim:

1. In a camera capable of flash light photographing employing a flash device comprising a flash tube which is made flashing in synchronism with a full opening of the exposure aperture by a shutter device and the quantity of flash light emitted from which is controlled by a flash output control circuit, improvements in the apparatus for controlling the operation of said flash device comprising:
   (a) switch means including a first and a second electrical contact and a movable contact segment, said movable contact segment being able to move between said first and second electrical contacts in link with the full opening of the aperture by said shutter device in such manner that said segment moves away from said first contact and then comes into contact with said second contact; and
   (b) control means for bringing said flash output control circuit into operation at the time when said movable contact segment leaves said first electrical contact toward said second one and for making said flash tube start flashing at the time when said segment comes into contact with said second electrical contact.

2. Apparatus as set forth in claim 1, wherein said flash output control device includes a photometering circuit for producing an output corresponding to the brightness of the object being photographed with flash light, and a timer circuit for producing an output signal for terminating the flashing of said flash tube after the lapse of a certain time determined by the output from said photometering circuit.

3. Apparatus as set forth in claim 2, wherein said control means includes a semiconductor element for making said timer circuit start counting time at the time when said movable contact segment leaves said first electrical contact.

4. Apparatus as set forth in claim 2, wherein said photometering circuit includes a photo receptor element disposed to receive the beam of light reflected upon the film plane when said shutter device has fully opened said aperture.

5. Apparatus as set forth in claim 1, wherein said switch means includes an insulating base plate on which said first and second electrical contacts are arranged spaced from each other by a predetermined distance.

* * * * *